US009762390B2

(12) United States Patent
McEwen et al.

(10) Patent No.: US 9,762,390 B2
(45) Date of Patent: Sep. 12, 2017

(54) ENHANCED TASK SCHEDULING FOR DATA ACCESS CONTROL USING QUEUE PROTOCOLS

(71) Applicant: Live Nation Entertainment, Inc., Beverly Hills, CA (US)

(72) Inventors: Robert McEwen, Los Angeles, CA (US); Debbie Hsu, Los Ageles, CA (US); John Carnahan, Los Angles, CA (US); Vasanth Kumar, Cerritos, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

(21) Appl. No.: 15/050,090

(22) Filed: Feb. 22, 2016

(65) Prior Publication Data
US 2017/0235940 A1   Aug. 17, 2017

Related U.S. Application Data

(63) Continuation-in-part of application No. 14/489,241, filed on Sep. 17, 2014, now abandoned, which is a
(Continued)

(51) Int. Cl.
*H04L 9/32* (2006.01)
*G06F 21/44* (2013.01)
(Continued)

(52) U.S. Cl.
CPC ................. *H04L 9/32* (2013.01); *G06F 9/50* (2013.01); *G06F 9/5005* (2013.01); *G06F 21/31* (2013.01);
(Continued)

(58) Field of Classification Search
CPC .... G06F 21/44; G06F 21/6218; G06F 9/5005; G06F 21/604; G06F 21/62; G06F 9/50; G06F 21/31; H04L 9/32
See application file for complete search history.

(56) References Cited

U.S. PATENT DOCUMENTS 6,662,230 B1   12/2003   Eichstaedt et al.
7,584,123 B1    9/2009   Karonis et al.
(Continued)

FOREIGN PATENT DOCUMENTS

JP   2002-183769   6/2002
JP   2003-331171   11/2003
(Continued)

OTHER PUBLICATIONS

U.S. Appl. No. 14/214,323, First action interview—Office Action issued on Nov. 20, 2014, 5 pages.
(Continued)

*Primary Examiner* — Theodore C Parsons
(74) *Attorney, Agent, or Firm* — Kilpatrick Townsend & Stockton LLP

(57) ABSTRACT

A system and method for scheduling tasks associated with controlling access to databases. The system and method relate to scheduling tasks for data requesting systems that satisfy particular conditions. For example, data requesting systems that satisfy the conditions may have associated tasks stored in a queue during a first processing phase. Data requesting systems that do not satisfy the conditions may have associated tasks inhibited from being stored in the queue during the first processing phase, but these tasks may be stored in the queue during a later second processing phase. Tasks stored in the queue during the first processing phase may be processed before tasks stored in the queue during the second processing phase. For example, the tasks
(Continued)

may correspond to accessing a database for querying data representing access rights to a resource.

20 Claims, 11 Drawing Sheets

Related U.S. Application Data continuation of application No. PCT/US2013/035487, filed on Apr. 5, 2013, application No. 15/050,090, which is a continuation-in-part of application No. 14/214,323, filed on Mar. 14, 2014, now abandoned.

(60) Provisional application No. 61/621,388, filed on Apr. 6, 2012, provisional application No. 61/788,173, filed on Mar. 15, 2013.

(51) Int. Cl.
  *G06F 21/62* (2013.01)
  *G06F 9/50* (2006.01)
  *G06F 21/60* (2013.01)
  *G06F 21/31* (2013.01)

(52) U.S. Cl.
  CPC ............ *G06F 21/44* (2013.01); *G06F 21/604* (2013.01); *G06F 21/62* (2013.01); *G06F 21/6218* (2013.01)

(56) References Cited

U.S. PATENT DOCUMENTS

| | | | |
|---|---|---|---|
| 7,970,713 | B1 | 6/2011 | Gorelik et al. |
| 8,255,288 | B1 | 8/2012 | Gupta et al. |
| 2003/0070096 | A1 | 4/2003 | Pazi et al. |
| 2003/0097307 | A1 | 5/2003 | Greene |
| 2004/0117654 | A1* | 6/2004 | Feldman ............ G06F 21/6218 726/22 |
| 2007/0245351 | A1* | 10/2007 | Sussman ............ G06F 9/50 718/104 |
| 2008/0263636 | A1* | 10/2008 | Gusler ............ G06F 21/316 726/4 |
| 2009/0204819 | A1 | 8/2009 | Parker |
| 2009/0204820 | A1 | 8/2009 | Brandenburg et al. |
| 2009/0276364 | A1* | 11/2009 | Iaia ............ G06Q 10/02 705/80 |
| 2010/0106671 | A1 | 4/2010 | Li et al. |
| 2010/0144314 | A1 | 6/2010 | Sherkin et al. |
| 2011/0231913 | A1* | 9/2011 | Feng ............ G06F 21/46 726/7 |
| 2011/0292031 | A1 | 12/2011 | Zhu et al. |
| 2012/0054834 | A1 | 3/2012 | King |
| 2012/0246008 | A1* | 9/2012 | Hamilton, II ......... G06Q 30/02 705/14.66 |
| 2012/0246737 | A1* | 9/2012 | Paxton ............ G06F 21/316 726/27 |
| 2013/0159125 | A1* | 6/2013 | Flavel ............ G06Q 30/0603 705/26.1 |
| 2013/0227078 | A1 | 8/2013 | Wei et al. |
| 2014/0045456 | A1 | 2/2014 | Ballai et al. |
| 2014/0052623 | A1* | 2/2014 | Pitroda ............ G06Q 20/02 705/39 |
| 2014/0278610 | A1 | 9/2014 | Carnahan et al. |
| 2015/0066546 | A1 | 3/2015 | Scarborough et al. |
| 2016/0078370 | A1 | 3/2016 | McEwen et al. |

FOREIGN PATENT DOCUMENTS

| | | |
|---|---|---|
| KR | 10-2001-0097451 | 11/2001 |
| KR | 10-0767025 B1 | 10/2007 |
| WO | 2011-106822 A1 | 9/2011 |
| WO | 2013-152311 | 10/2013 |

OTHER PUBLICATIONS

U.S. Appl. No. 14/214,323, Final Office Action issued on Jan. 28, 2015, 7 pages.
U.S. Appl. No. 14/214,323, Advisory Action issued on May 8, 2015, 5 pages.
International Preliminary Report on Patentability of PCT/US2013/035487 mailed on Apr. 5, 2013, 7 pages.
U.S. Appl. No. 14/214,323, Pre-interview first office action mailed on Jun. 11, 2014, 3 pages.
International Search Report and Written Opinion of PCT/US2013/035487 mailed on Jul. 12, 2013, 8 pages.
U.S. Appl. No. 14/489,241, filed Sep. 17, 2014 First Action Interview Office Action mailed Apr. 6, 2015, all pages.
U.S. Appl. No. 14/489,241, filed Sep. 17, 2014 Final Office Action mailed on Aug. 20, 2015, all pages.
U.S. Appl. No. 14/489,241, filed Sep. 17, 2014 Advisory Office Action mailed on Feb. 9, 2016, all pages.
U.S. Appl. No. 14/214,323 filed Mar. 14, 2016 Non-Final Office Action mailed Oct. 8, 2015, all pages.
U.S. Appl. No. 14/214,323 filed Mar. 14, 2016 Final Office Action mailed Mar. 21, 2016, all pages.

* cited by examiner

ENHANCED TASK SCHEDULING FOR DATA ACCESS CONTROL USING QUEUE PROTOCOLS

CROSS-REFERENCE TO RELATED APPLICATIONS

The present application is a continuation-in-part of U.S. patent application Ser. No. 14/489,241 filed Sep. 17, 2014, entitled "CONTROLLED ACCESS QUEUE-BASED GATING BASED ON COOPERATIVE DETECTION OF VIABLE REGISTRATION," which is a continuation of PCT Patent Application No. PCT/US2013/035487 filed Apr. 5, 2013, entitled "METHODS AND SYSTEMS OF INHIBITING AUTOMATED SCRIPTS FROM ACCESSING A TICKET SITE," which claims the priority benefit under 35 USC 119(e) to Provisional Patent Application No. 61/621,388 filed Apr. 6, 2012, entitled "METHODS AND SYSTEMS OF INHIBITING AUTOMATED SCRIPTS FROM ACCESSING A TICKET SITE," and is also a continuation-in-part of U.S. patent application Ser. No. 14/214,323 filed Mar. 14, 2014, entitled "ABUSE TOLERANT TICKETING SYSTEM," which claims the priority benefit under 35 USC 119(e) to Provisional Patent Application No. 61/788,173 filed Mar. 15, 2013, entitled "ABUSE TOLERANT TICKETING SYSTEM," the disclosures of each of which are incorporated by reference herein in its entirety for all purposes.

TECHNICAL FIELD

This disclosure generally relates to systems and methods for controlling access to data. More particularly, this disclosure relates to scheduling tasks for controlling access to databases using queue protocols.

BACKGROUND

Generally, data can be stored in databases. Various systems can access the databases to retrieve the data. However, controlling access to the databases is often insecure, inefficient, or burdensome on processing resources (e.g., a processor).

SUMMARY

In some embodiments, a computer-implemented method for scheduling tasks using queue protocols to control data access may be provided. The method may include receiving a first communication from a first data requesting system and a second communication from a second data requesting system. For example, the first communication may include a first request to access a database associated with access rights indicative of access to a resource. As a further example, the second communication may include a second request to access the database. The method may include accessing a queue protocol for scheduling one or more tasks associated with the first and second requests. The queue protocol may identify a first processing phase and a second processing phase. Further, the method may include identifying a first task corresponding to the first request and a second task corresponding to the second request. The identifying of the first task and the second task may be based on the queue protocol. The first task may enable the first data requesting system to access the database and the second task may enable the second data requesting system to access the database.

In addition, the method may include determining, based at least in part on the queue protocol and the first request, that the first task is to be scheduled for processing during the first processing phase. Further, the method may include determining, based at least in part on the queue protocol and the second request, that the second task is not to be scheduled for processing during the first processing phase. The method may include, during the first processing phase: scheduling the first task for processing by storing the first task in a queue based on the determination that the first task is to be scheduled, and inhibiting the second task from being stored in the queue based on the determination that the second task is not to be scheduled. The method may also include during the second processing phase occurring after the first processing phase: controlling a first access to the database for the first data requesting system, scheduling the second task for processing by storing the second task in the queue, and controlling a second access to the database for the second data requesting system. The controlling the first access may correspond to processing the first task. The controlling the second access may correspond to processing the second task after the first task has been processed.

In some embodiments, a computer program product or system is provided that is tangibly embodied in a non-transitory machine-readable storage medium. The computer program product or system includes instructions configured to cause one or more data processors to perform actions including part or all of a method disclosed herein.

BRIEF DESCRIPTION OF THE DRAWINGS

The present disclosure is described in conjunction with the appended figures.

Figure 1:
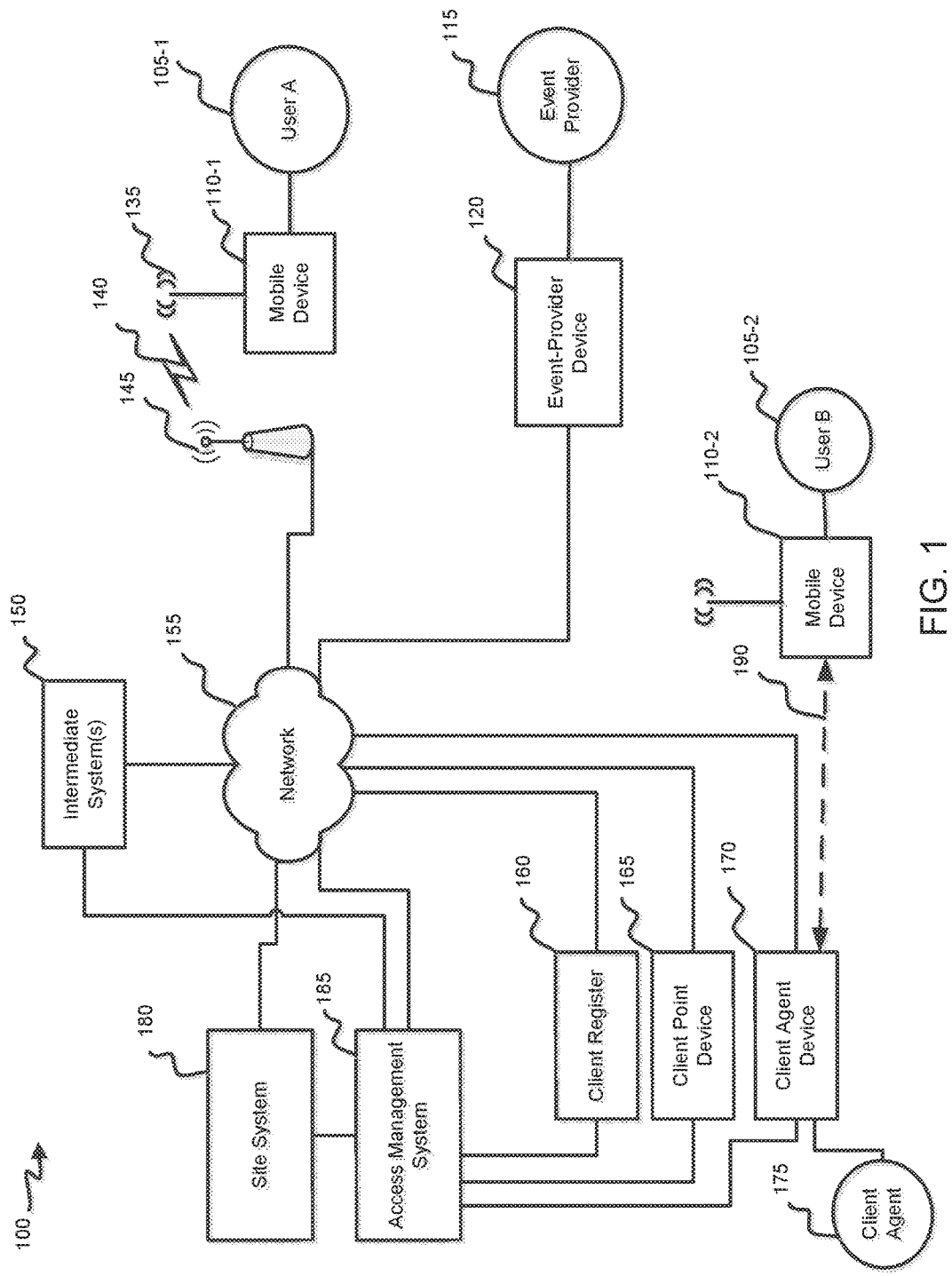
FIG. 1 depicts a block diagram of an embodiment of a resource access-facilitating interaction system.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Certain aspects and features of the present disclosure relate to a system and method for scheduling tasks associated with controlling access to databases. In particular, the system and method relate to prioritizing tasks for data requesting systems that satisfy particular conditions. For example, data requesting systems that satisfy the conditions may have associated tasks stored in a queue during a first processing phase. Data requesting systems that do not satisfy the conditions may have associated tasks inhibited from being stored in the queue during the first processing phase, but these tasks may be stored in the queue during a later second processing phase. In some embodiments, the tasks may correspond to accessing a database for querying data representing access rights to a resource.

In some embodiments, certain aspects and features of the present disclosure relate to a system and method for receiving requests to access data from data requesting systems. The requests may be analyzed to determine whether to schedule tasks associated with the requests in a queue for processing during a first processing phase (e.g., a period of time). For example, a first request from a first data requesting system can be analyzed, and a first task associated with the first request can be scheduled during the first processing phase based on the analysis by being stored in the queue. As another example, a second request from a second data requesting system can be analyzed, and a second task associated with the second request can be inhibited from being processed during the first processing phase based on the analysis by not being stored in the queue. In this example, the second request can be stored in the queue for processing during a second processing phase after the first processing phase. The first task can be processed before the second task is processed. Processing the first task can correspond to controlling a first access to the database. Processing the second task, which occurs after the first task is processed, can correspond to controlling a second access to the database.

In some embodiments, analysis of the first request from the first data requesting system and the second request from the second data requesting system may include identifying whether one or more authentication tests were executed on the first or second data requesting systems. For example, the first request may include authentication information representing an authentication test successfully completed and executed at the first data requesting system. As another example, the second request may include authentication information representing that an authentication test was unsuccessfully completed and executed at the second data requesting system. In some examples, the authentication test may indicate that an operator or user of the first data requesting system corresponds to an authorized user. For example, an authorized user may correspond to a user authorized to access the database (e.g., by storing a first task in a queue during the first processing phase). In some examples, unauthorized users may not have their tasks scheduled during a particular period of time (e.g., during the first processing phase). In some examples, unauthorized users may be inhibited from access to a queue until a particular period of time (e.g., until the second period).

In some embodiments, when the second request is determined to be associated with an unauthorized user (e.g., a bot user operated at a server farm) by an access management system, for example, based on the authentication information included in the second request, the access management system may apply one or more modification protocols to interactions with the second data requesting system. For example, if the second data requesting system is determined to be an unauthorized user (e.g., a bot user), the access management system may apply a blocking factor to any subsequent interactions between the access management system and the second data requesting system. Examples of modification protocols may include controlling a speed of an access-right requesting process (e.g., a process for requesting an access right to a resource) so as to be reduced or stopped, modifying an interface transmitted to the second data requesting system (e.g., the interface being used for the access-right requesting process), or executing one or more authentication tests (e.g., a bot-detection test), or other suitable examples. In some embodiments, the access management system may determine whether the second data requesting system corresponds to an authorized user before or in conjunction with the second request being received at the access management system, as discussed herein.

Accordingly, processing resources (e.g., CPUs that process requests to access a database) may be improved and efficiently managed using task scheduling techniques. The overall processing demand (e.g., system load) experienced at a processor that manages data access may be reduced due to the task scheduling of data access control, thereby improving the performance and functionality of the processor.

FIG. 1 depicts a block diagram of an embodiment of a resource management system 100, according to an embodiment of the present disclosure. Mobile device 110 (which can be operated by a user 105) and an event-provider device 120 (which can be operated, controlled, or used by an event provider 115) can communicate with an access management system 185 directly or via another system (e.g., via an intermediate system 150). Mobile device 110 may transmit data to access point 145, which is connected to network 155, over communication channel 140 using antennae 135. While FIG. 1 illustrates mobile device 110 communicating with access point 145 using a wireless connection (e.g., communication channel 140), in some embodiments, mobile device 110 may also communicate with access point 145 using a wired connection (e.g., an Ethernet connection). Mobile device 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource management system 100 can be extended to include multiple of any given system(s), device(s), entity(ies), and/or networks.

Access management system 185 can be configured to manage a dynamic set of access rights to one or more resources. More specifically, access management system 185 can track which resources are to be made available to users, specifications of the resources and times at which they will be available. Access management system 185 can also allocate access rights for resources and facilitate transmissions of notifications of the available rights to a set of user devices. For example, access management system 185 can alert users of the availability via a website, app page or email. As another example, access management system can transmit data about access rights and resources to one or more intermediate systems 150, which can facilitate distribution of access-right availability and processing of requests for such rights.

Notifications of available access rights can be accompanied by options to request that one or more access rights be assigned to a user. Therefore, user 105 can provide input to mobile device 110 via an interface to request such assignment and provide other pertinent information. Intermediate system 150 and/or access management system 185 can process the request to ensure that the requested access right(s) remain available and that all required information has been received and, in some instances, verified. Thereafter, access management system 185 can assign one or more access rights to the user, e.g., matching the access rights requested by the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at mobile device 110 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access right. Exemplary client devices can include client agent device 170, which can be one operated by a client agent 175 (e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof; and client point device 165 can be an electronic device positioned at or within a resource-associated location.

In some instances, mobile device 110 performs particular functions upon detecting a client device and/or the contrary. For example, mobile device 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device 110.

In some instances, user 105 can use multiple mobile devices 110 to perform various operations (e.g., using one device to request an access right and another to interact with client devices). Some instances of mobile device 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 185. For example, a database or data store include a list of identifiers for each user or user device having an assigned access right for a resource or associating an identifier for each user or user device with an identifier of a particular access right. In some instances, indicia can be transmitted to a user device that indicates that an access right is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access rights to intermediate systems 150 (e.g., upon acceptance of terms). Intermediate system 150 can then collect data pertaining to the assigned access rights and/or a corresponding event, can format and/or edit the data, generate a notification of availability of the access rights that includes the formatted and/or edited data and facilitate presentation of the notification at a mobile device 110. When intermediate system 150 receives a communication from the mobile device 110 indicative of an access-right request, intermediate system 150 can facilitate assignment (or reassignment) of an access right to the user (e.g., by transmitting relevant information to access management system 185 identifying the user and/or user device and/or by transmitting relevant information to mobile device 110 pertaining to the access right).

A resource can include one managed or provided by a client, such as a performing entity or an entity operating a venue. A mobile device 110 can transmit data corresponding to the access right (e.g., an access-enabling code) to a client device upon, for example, detecting the client device, detecting that a location of the mobile device 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 155 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

It will be appreciated that, while a variety of devices and systems are shown in FIG. 1, in some instances, resource management system 100 can include fewer devices and/or systems. Further, some systems and/or devices can be combined. For example, a client agent device 170 may also serve as an access management system 185 or intermediate system 150 so as to as to facilitate assignment of access rights.

As described in further detail herein, an interaction between mobile device 110 and a client device (e.g., client agent device 170, client register 160 or client point device 165) can facilitate, for example, verification that user 105 has a valid and applicable access right, obtaining an assignment of an access right, and/or obtaining an assignment of an upgraded access right.

In addition, mobile device 110-2, which is operated by user 125-2, may include a user device that is located at a stadium or concert hall during an event. Mobile device 110-2 may directly interact with a client device (e.g., client agent device 170, client register 160 or client point device 165), which is also located at the stadium or concert hall during the event. As such, the access management system 185 may be updated or accessed by mobile device 110-2 via the client agent device 170. For example, mobile device 110-2 may communicate with the client agent device 170 over a short-range communication channel 190, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short-range communication link 190 is established, mobile device 110-2 may communicate with the access management system 185 and access the item or items of resources. That is, while mobile device B is configured to communicate over network 155, mobile device 110-2 may communicate with the access management system 185 via the client agent device 170, instead of the network 155.

It will be appreciated that various parts of system 100 can be geographically separated. It will further be appreciated that system 100 can include a different number of various components rather than a number depicted in FIG. 1. For example, two or more of access assignment systems 185; one or more site systems 180; and intermediate system 150 may be located in different geographic locations (e.g., different cities, states or countries).

Figure 2:
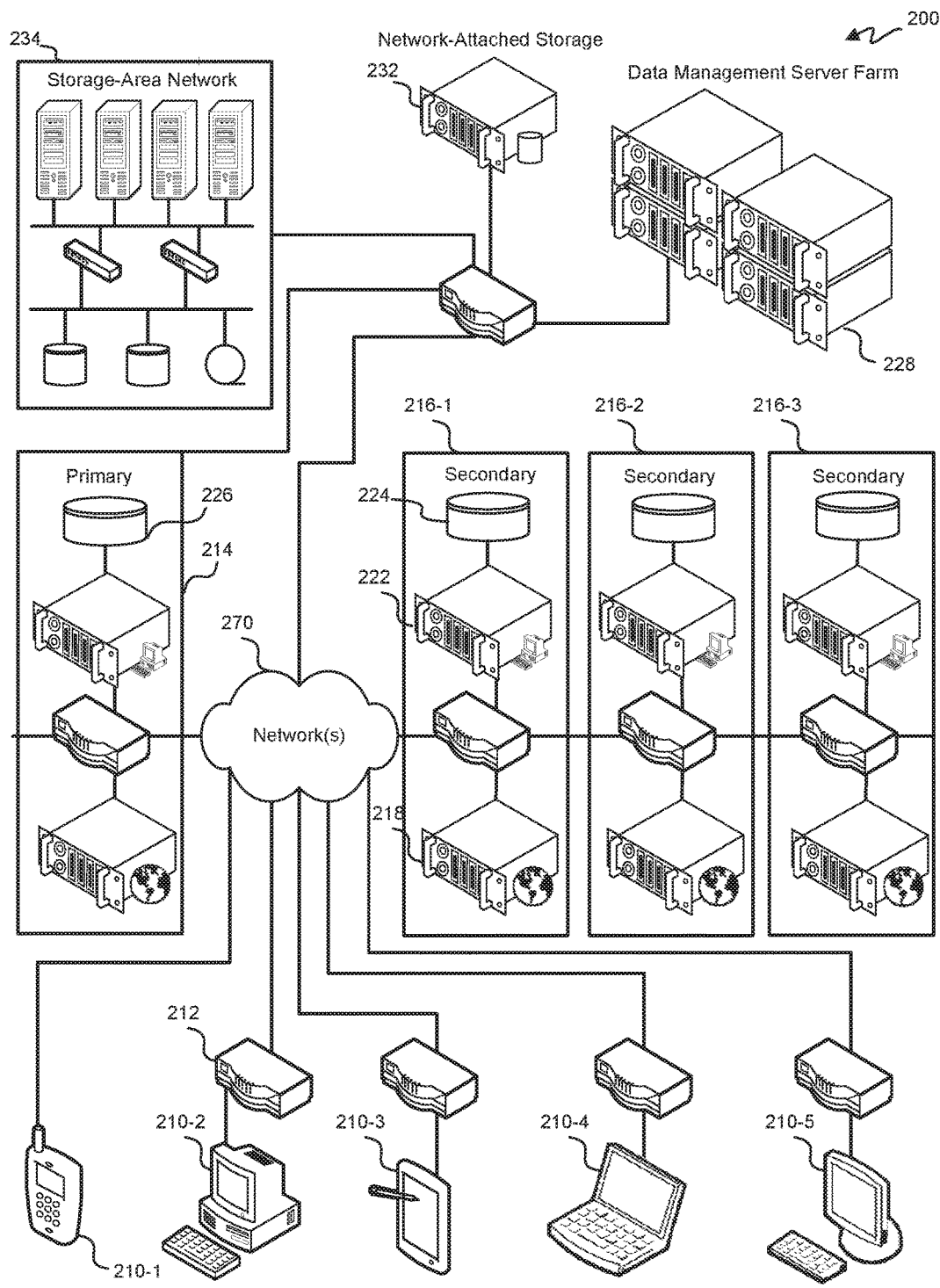
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Such transfer may occur as a result of a sale or fee payment. Secondary assignment management system 216 may also manage transfer offers (e.g., to allow a user to identify a price at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of an account, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, including payment information, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 120 can include a primary access assignment system 214 and/or a secondary access assignment system 214; data management server farm 228; and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
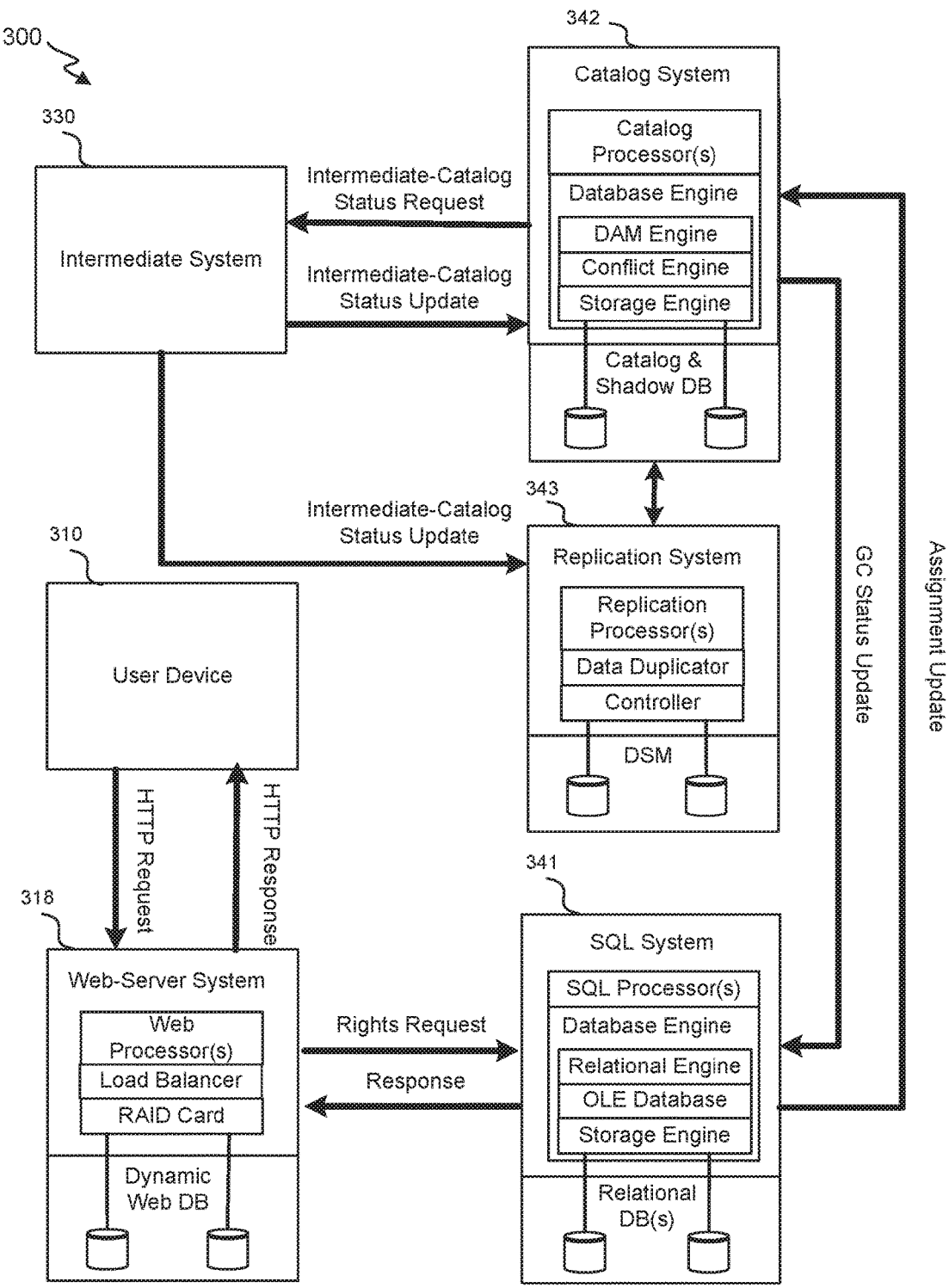
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user account data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, account and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information.

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of datastore queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic web-pages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
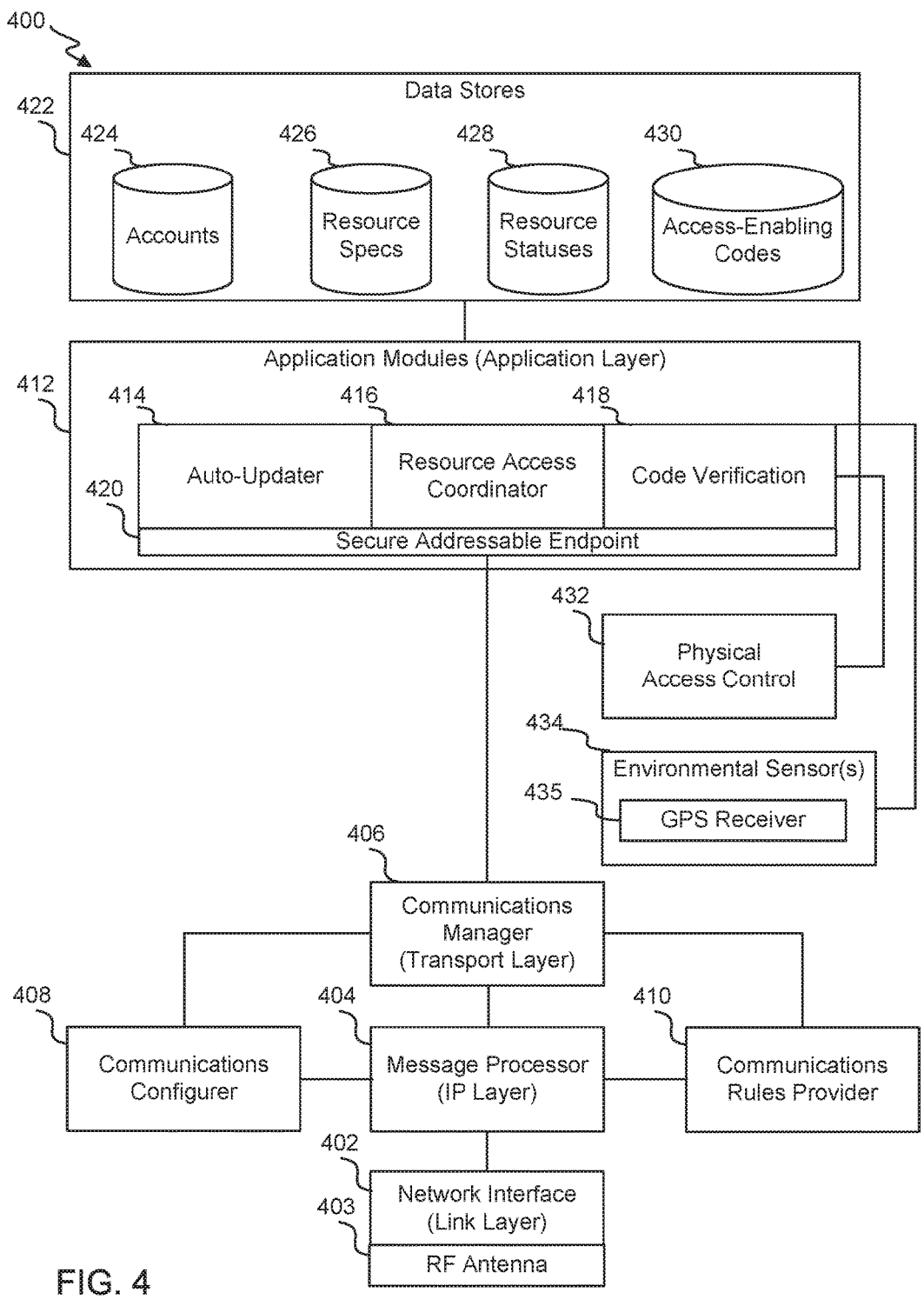
FIG. 4 illustrates example components of a device.

FIG. 4 illustrates example components of a device 400, such as a client device (e.g., client agent device 140, client register 150 and/or client point device 160), an intermediate system (e.g., intermediate system 130) and/or an access management system (e.g., access management system 120) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource (e.g., available seat reservations for a sporting event or concert). As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting an inventory check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as an account data store 424, resource specification data store 426, resource status data store 428 and/or access-enabling code data store 430.

Account data store 424 can store data for entities, such as administrators, intermediate-system agents and/or users. The account data can include login information (e.g., username and password), identifying information (e.g., name, residential address, phone number, email address, age and/or gender), professional information (e.g., occupation, affiliation and/or professional position), preferences (e.g., regarding event types, performers, seating areas, and/or resource types), purchase data (e.g., reflecting dates, prices and/or items of past purchases) and/or payment data (e.g., credit card number and expiration date or payment account information). The account data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a performing entity, a venue of the event and/or a set of seats (e.g., a chart or list). Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, reserved or was assigned a resource. In some instances, status information can indicate that a resource is being held or reserved and may identify an entity associated with the hold or reserve and/or a time at which the hold or reservation will be released.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for tickets to a particular event can be unique relative to each other. In some instances, at least part of a code identifies a resource or specification of a resource. For example, for a ticket to a concert, various portions of a code may reflect: a performing entity, resource location, date, section and access-permitted location identifier.

One or more of data stores 424, 426, 428, and 430 can be a relational data store, such that elements in one data store can be referenced within another data store. For example, resource status data store 428 can associate an identifier of a particular ticket with an identifier of a particular entity. Additional information about the entity can then be retrieved by looking up the entity identifier in account data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
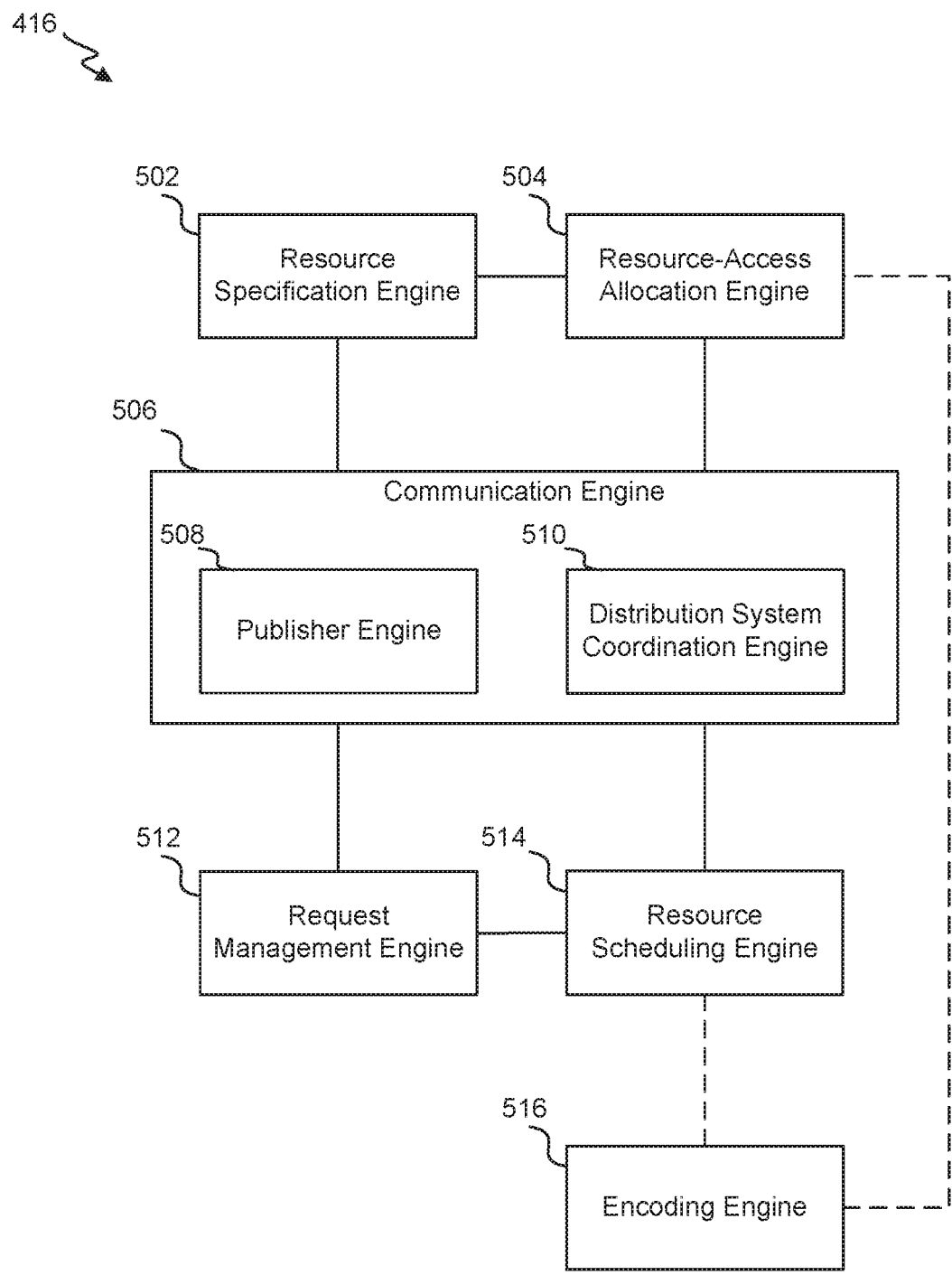
FIG. 5 illustrates example components of resource access coordinator module.

FIG. 5 illustrates example components of resource access coordinator module 416 that may operate, at least in part, at an access management system (e.g., access management system) according to an embodiment of the invention. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or venue) of the resource. A specification can also or alternatively include one or more parties associated with the resource (e.g., performing acts or teams). Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on fee payment or authorization thereof, an allocated access right can be initially unassociated with particular entities (e.g., users). For example, an allocated right can correspond to one or more access characteristics, such as an processor identifier, a usage time, a memory allocation, a geographic location (e.g., section or seat identifier), and/or a fee. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event and corresponding fees. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights for seats in Section 1 may be provided for a first intermediate system to assign, and access rights for seats in Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name), access-right identifying information (e.g., identifying a resource and/or access-right characteristic) user contact information (e.g., address, phone number, and/or email address), and/or user device information (e.g., type of device, device identifier, and/or IP address).

When all required information has not been received, request management engine 512 can facilitate collection of the information (e.g., via a webpage, app page or communication to an intermediate system). Request management engine 512 can also or alternatively collect payment information, determine that payment information has been received, obtain authorization of payment, determine that payment has been authorized (e.g., via an intermediate system), collect payment, and/or determine that payment has been collected. For example, publisher engine 508 may receive a credit card number and expiration date via a webpage, and request management engine 512 can request authorization for an amount of the requested access rights. In some instances, payment assessments are performed subsequent to at least temporary assignments of access rights. In some instances, request management engine 512 retrieves data from a user account. For example, publisher engine 508 may indicate that a request for an access right has been received while a user was logged into a particular account. Request management engine 512 may then retrieve, for example, contact information, device information, and/or preferences and/or payment information associated with the account from account data store 424.

In some instances, request management engine 512 prioritizes requests, such as requests for overlapping, similar or same access rights (e.g., requests for access rights associated with a same section) received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests (e.g., based on rankings of the systems), whether requests were associated with users having established accounts, and/or whether requests were associated with inputs indicative of a bot initiating the request (e.g., shorter inter-click intervals, failed CAPTCHA tests, purchase history departing from a human profile).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining payment authorization and/or user confirmation) and/or to change a status of the access right(s) to indicate that they have been assigned (e.g., immediately, upon receiving payment authorization or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, a barcode (e.g., a 1-dimensional or 2-dimensional barcode), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a ticket document with a barcode may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in account data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 120, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user account, and code verification module 418 can determine whether the code-identified device or account matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable fashion so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
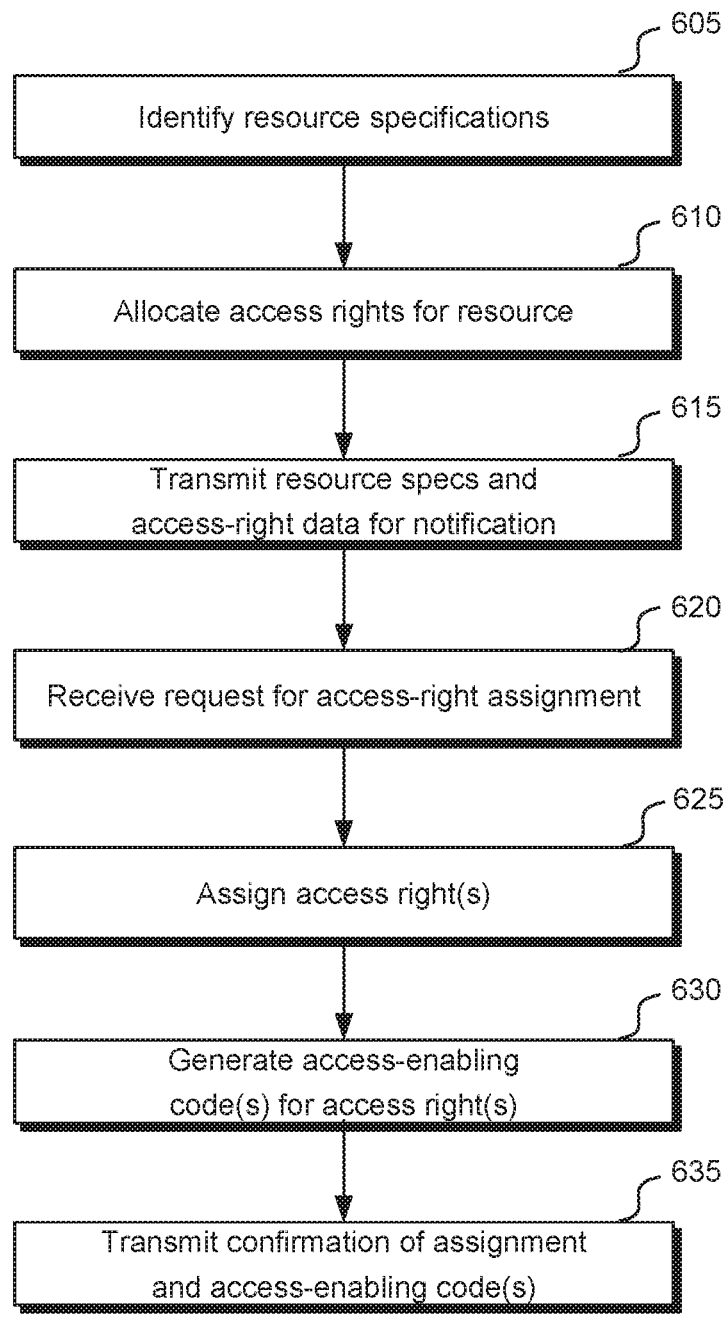
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 120. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location (e.g., seat) assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether a fee for the access rights has been authorized. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied, fee provision and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7A:
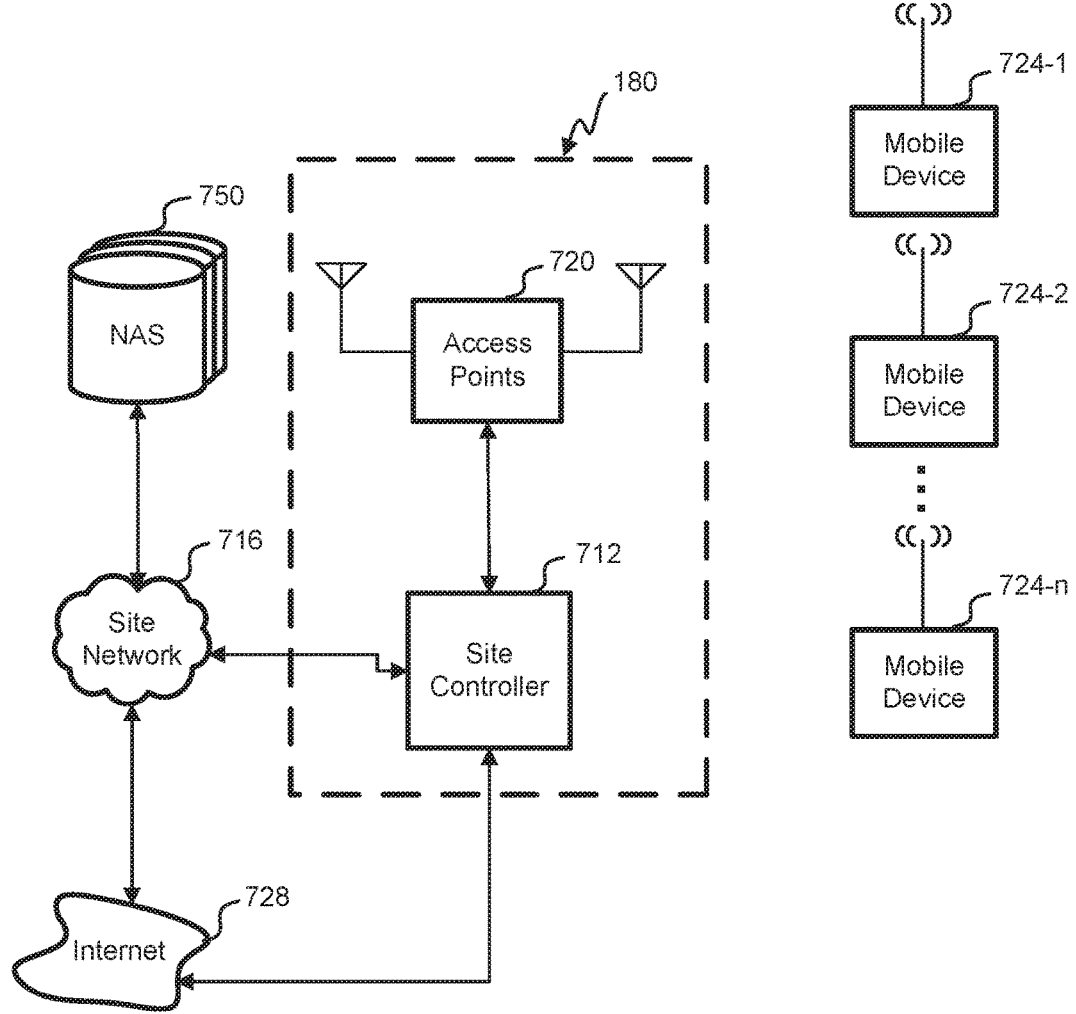
FIGS. 7A and 7B show embodiments of site systems in relations to mobile devices.

Referring to FIG. 7A, an embodiment of a site system 180 is shown in relation to mobile devices 724-*n*, Network Attached Storage (NAS) 750, site network 716 and the Internet 728. In some embodiments, for attendees of a live event or concert, site network 716 and site system 180 provide content, services and/or interactive engagement using mobile devices 724. Connections to site system 180 and site network 716 can be established by mobile devices 724 connecting to access points 720. Mobile devices 724 can be a type of end user device 110 that is portable, e.g., smartphones, mobile phones, tablets, and/or other similar devices.

Site network 716 can have access to content (information about attendees, videos, pictures, music, trivia information, etc.) held by NAS 750. Additionally, as described herein, content can be gathered from attendees both before and during the event. By connecting to site network 716, mobile device 724 can send content for use by site system 180 or display content received from NAS 750.

Figure 7B:
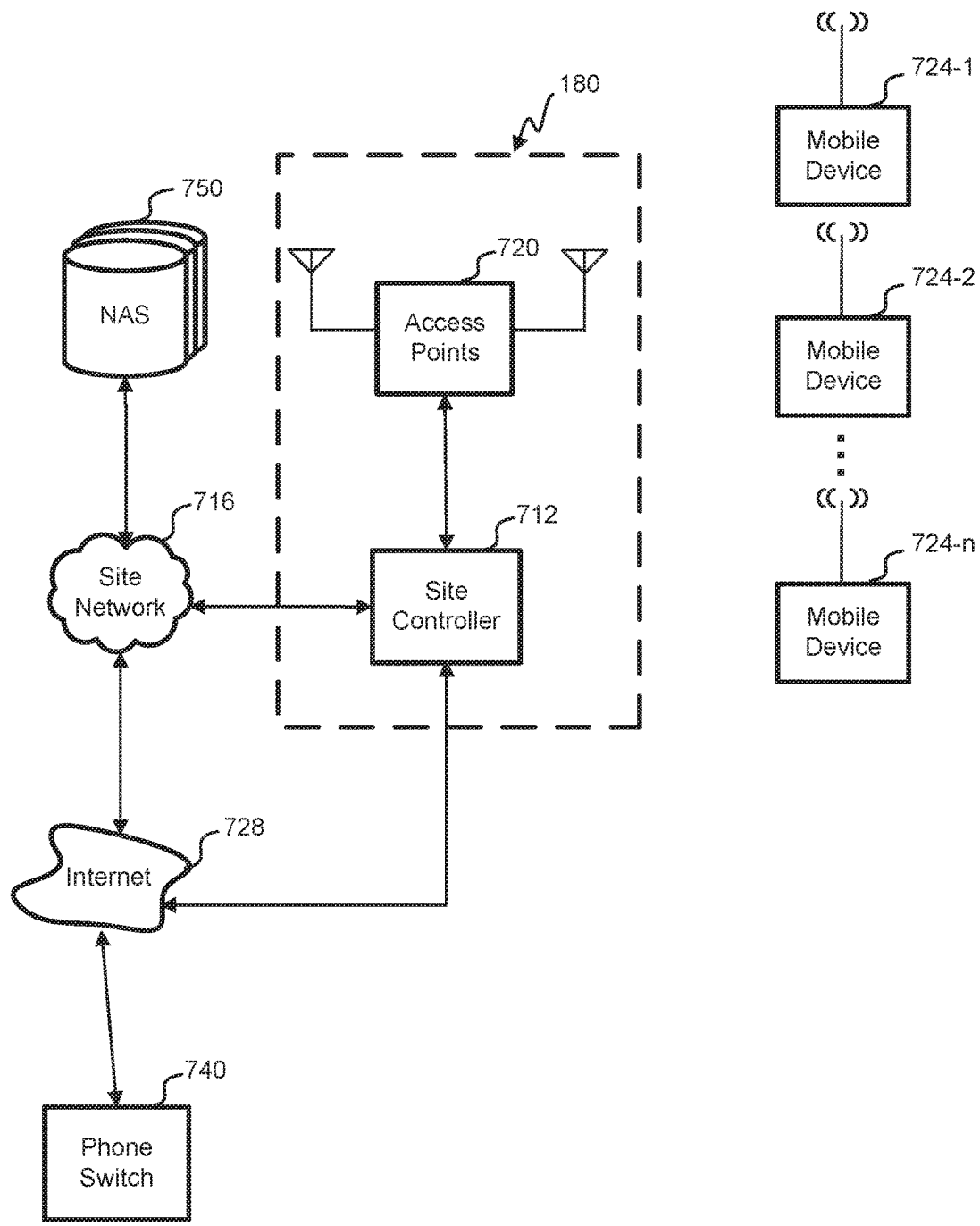

Referring to FIG. 7B, another embodiment of a site system 180 is shown in relation to mobile devices 724-*n*, Network Attached Storage (NAS) 750, site network 716 and the Internet 728, in an embodiment. FIG. 7B additionally includes phone switch 740. In some embodiments, phone switch 740 can be a private cellular base station configured to spoof the operation of conventionally operated base stations. Using phone switch 740 at an event site allows site system 180 to provide additional types of interactions with mobile devices 724. For example, without any setup or configuration to accept communications from site controller 712, phone switch 740 can cause connected mobile devices 724 to ring and, when answered, have an audio or video call be established. When used with other embodiments described herein, phone switch 740 can provide additional interactions. For example, some embodiments described herein use different capabilities of mobile devices 724 to cause mass sounds and/or establish communications with two or more people. By causing phones to ring and by establishing cellular calls, phone switch can provide additional capabilities to these approaches.

Figure 8:
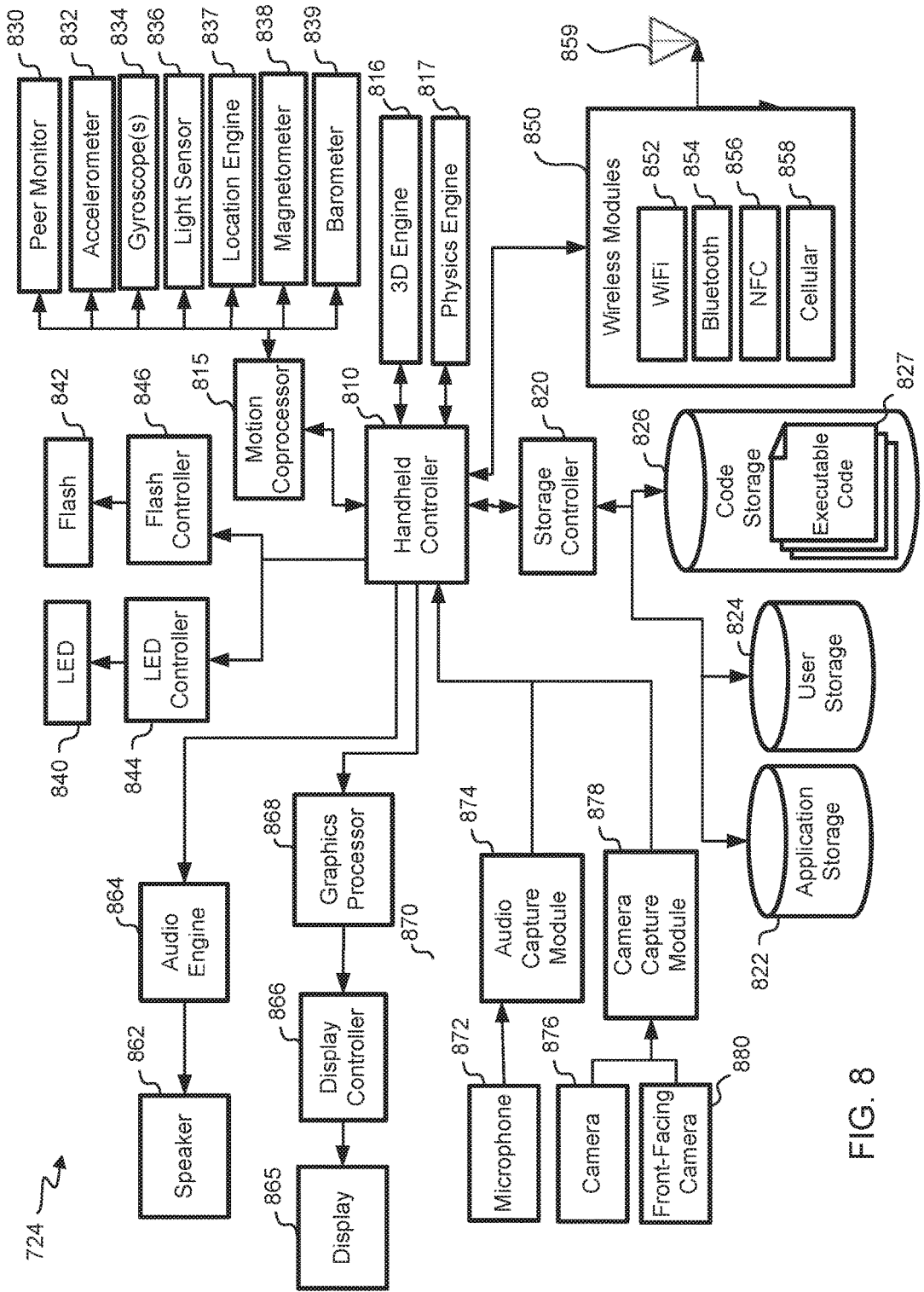
FIG. 8 shows a block diagram of user device according to an embodiment.

FIG. 8 shows a block diagram of user device 110 according to an embodiment. User device 110 includes a handheld controller 810 that can be sized and shaped so as enable the controller and user device 110 in a hand. Handheld controller 810 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 810 can communicate with a storage controller 820 so as to facilitate local storage and/or retrieval of data. It will be appreciated that handheld controller 810 can further facilitate storage and/or retrieval of data at a remote source via generation of communications including the data (e.g., with a storage instruction) and/or requesting particular data.

Storage controller 820 can be configured to write and/or read data from one or more data stores, such as an application storage 822 and/or a user storage 824. The one or more data stores can include, for example, a random access memory (RAM), dynamic random access memory (DRAM), read-only memory (ROM), flash-ROM, cache, storage chip, and/or removable memory. Application storage 822 can include various types of application data for each of one or more applications loaded (e.g., downloaded or pre-installed) onto user device 110. For example, application data can include application code, settings, profile data, databases, session data, history, cookies and/or cache data. User storage 824 can include, for example, files, documents, images, videos, voice recordings and/or audio. It will be appreciated that user device 110 can also include other types of storage and/or stored data, such as code, files and data for an operating system configured for execution on user device 110.

Handheld controller 810 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 8 shows several exemplary sensors and detection engines, including a peer monitor 830, accelerometer 832, gyroscope 834, light sensor 836 and location engine 838. Each sensor and/or detection engine can be configured to collect a measurement or make a determination, for example, at routine intervals or times and/or upon receiving a corresponding request (e.g., from a processor executing an application code).

Peer monitor 830 can monitor communications, networks, radio signals, short-range signals, etc., which can be received by a receiver of user device 110) Peer monitor 830 can, for example, detect a short-range communication from another device and/or use a network multicast or broadcast to request identification of nearby devices. Upon or while detecting another device, peer monitor 830 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 832 can be configured to detect a proper acceleration of user device 110. The acceleration may include multiple components associated with various axes and/or a total acceleration. Gyroscope 834 can be configured to detect one or more orientations (e.g., via detection of angular velocity) of user device 110. Gyroscope 834 can include, for example, one or more spinning wheels or discs, single- or multi-axis (e.g., three-axis) MEMS-based gyroscopes.

Light sensor 836 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 838 can be configured to detect (e.g., estimate) a location of user device 110. For example, location engine 838 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 838 can process signals from multiple sources and can estimate a location of user device 110 using a triangulation technique. In some instances, location engine 838 can process a single signal and estimate its location as being the same as a location of a source of the signal.

User device 110 can include a flash 842 and flash controller 846. Flash 842 can include a light source, such as (for example), an LED, electronic flash or high-speed flash. Flash controller 846 can be configured to control when flash 842 emits light. In some instances, the determination includes identifying an ambient light level (e.g., via data received from light sensor 836) and determining that flash 842 is to emit light in response to a picture- or movie-initiating input when the light level is below a defined threshold (e.g., when a setting is in an auto-flash mode). In some additional or alternative instances, the determination includes determining that flash 846 is, or is not, to emit light in accordance with a flash on/off setting. When it is determined that flash 846 is to emit light, flash controller 846 can be configured to control a timing of the light so as to coincide, for example, with a time (or right before) at which a picture or video is taken.

User device 110 can also include an LED 840 and LED controller 844. LED controller 844 can be configured to control when LED 840 emits light. The light emission may be indicative of an event, such as whether a message has been received, a request has been processed, an initial access time has passed, etc.

Flash controller 846 can control whether flash 846 emits light via controlling a circuit so as to complete a circuit between a power source and flash 846 when flash 842 is to emit light. In some instances, flash controller 846 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 850 configured to appropriately facilitate transmission or receipt of wireless signals of a particular type. Wireless modules 850 can include a Wi-Fi module 852, Bluetooth module 854, near-field communication (NFC) module 856 and/or cellular module 856. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 854 can be configured to generate and/or process radio signals with a frequency between 2.4 gigahertz and 5 gigahertz. Wi-Fi module 854 can include a wireless network interface card that includes circuitry to facilitate communicating using a particular standard (e.g., physical and/or link layer standard).

Bluetooth module 854 can be configured to generate and/or process radio signals with a frequency between 2.4 gigahertz and 2.485 gigahertz. In some instances, bluetooth module 854 can be configured to generate and/or process Bluetooth low-energy (BLE or BTLE) signals with a frequency between 2.4 gigahertz and 2.485 gigahertz.

NFC module 856 can be configured to generate and/or process radio signals with a frequency of 13.56 megahertz. NFC module 856 can include an inductor and/or can interact with one or more loop antenna.

Cellular module 858 can be configured to generate and/or process cellular signals at ultra-high frequencies (e.g., between 698 and 2690 megahertz). For example, cellular module 858 can be configured to generate uplink signals and/or to process received downlink signals.

The signals generated by wireless modules 850 can be transmitted to one or more other devices (or broadcast) by one or more antennas 859. The signals processed by wireless modules 850 can include those received by one or more antennas 859. One or more antennas 859 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 862 can be configured to present an audio output by converting an electrical signal into an audio signal. An audio engine 864 can effect particular audio characteristics, such as a volume, event-to-audio-signal mapping and/or whether an audio signal is to be avoided due to a silencing mode (e.g., a vibrate or do-not-disturb mode set at the device).

Further, a display 866 can be configured to present a visual output by converting an electrical signal into a light signal. Display 866 may include multiple pixels, each of which may be individually controllable, such that an intensity and/or color of each pixel can be independently controlled. Display 866 can include, for example, an LED- or LCD-based display.

A graphics engine 868 can determine a mapping of electronic image data to pixel variables on a screen of user device 110. It can further adjust lighting, texture and color characteristics in accordance with, for example, user settings.

In some instances, display 866 is a touchscreen display (e.g., a resistive or capacitive touchscreen) and is thus both an input and an output component. A screen controller 870 can be configured to detect whether, where and/or how (e.g., a force of) a user touched display 866. The determination may be made based on an analysis of capacitive or resistive data.

An input component can be configured to receive input from a user that can be translated into data. For example, as illustrated in FIG. 8, user device 110 can include a microphone 872 that can capture audio data and transform the audio signals into electrical signals. An audio capture module 874 can determine, for example, when an audio signal is to be collected and/or any filter, equalization, noise gate, compression and/or clipper that is to be applied to the signal.

User device 110 can further include one or more cameras 876, 880, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 876 and a front-facing camera 880.

A camera capture module 878 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 878 may further determine which camera(s) is to collect image data (e.g., based on a setting).

Figure 9:
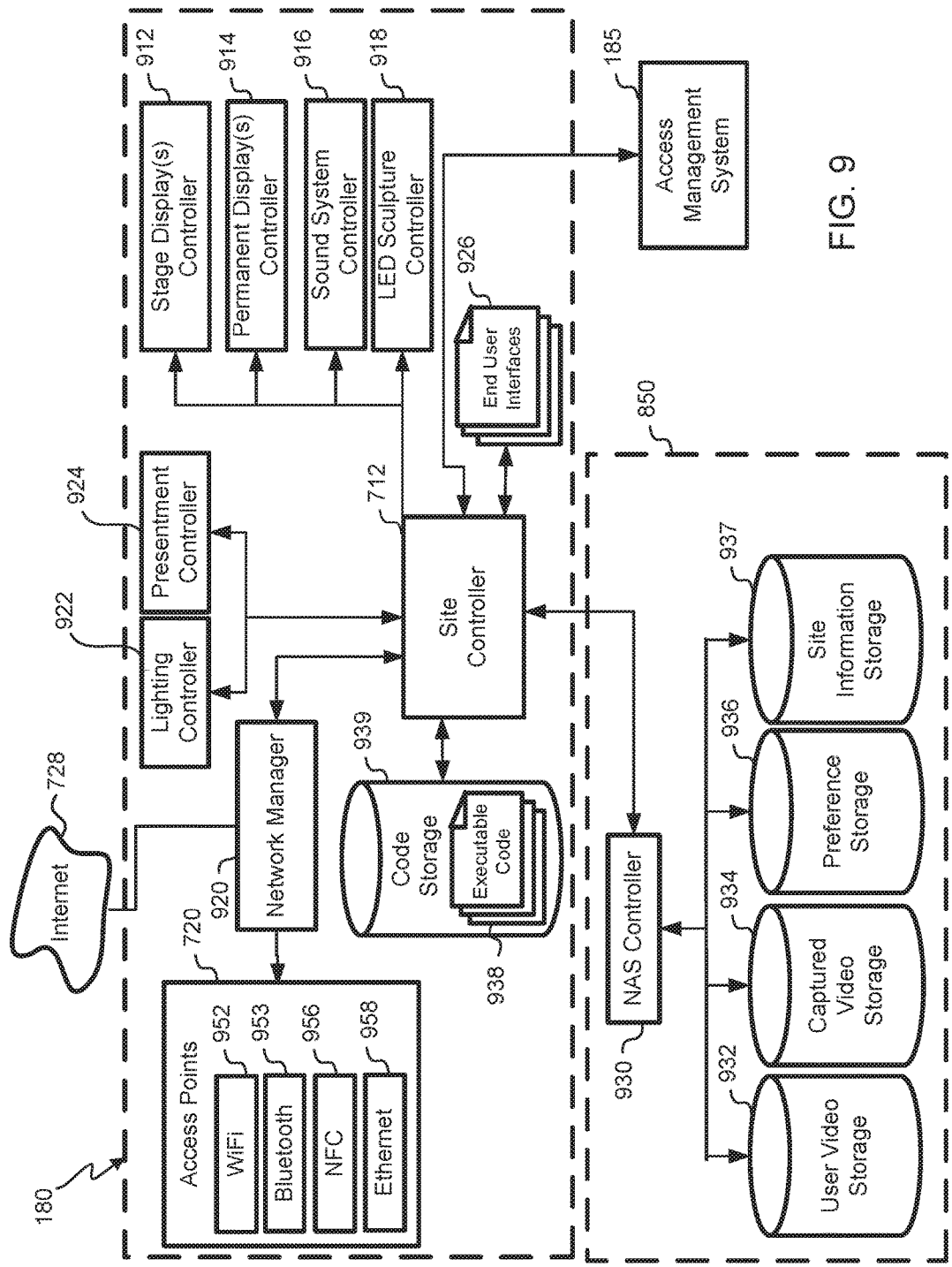
FIG. 9 illustrates sample components of an embodiment of site system 180, including connections to a NAS and access management system.

FIG. 9 illustrates sample components of an embodiment of site system 180, including connections to NAS 750 and access management system 185. Embodiments of site controller 712 use network manager 920 to connect via access points 720 (using e.g., WiFi 952, Bluetooth 953, NFC 956, Ethernet 958, and/or other network connections) to other network components, such as site network 716 and mobile devices 724. In some embodiments, site system 280 uses site controller 712 to control aspects of an event venue. A broad variety of venue features can be controlled by different embodiments, including: permanent lights (e.g., with lighting controller 922), stage lights (e.g., with presentment controller 924), stage display screens (e.g., with stage display(s) controller 912), permanent display screens (e.g., with permanent display(s) controller 914), and the venue sound system (e.g., with the sound system controller 916).

A more detailed view of NAS 750 is shown, including NAS controller 930 coupled to user video storage 932, captured video storage 934, preference storage 936, and 3D model 938. Captured video storage 934 can receive, store and provide user videos received from mobile devices 724. In some embodiments, site controller 712 triggers the automatic capture of images, audio and video from mobile devices 724, such triggering being synchronized to activities in an event. Images captured by this and similar embodiments can be stored on both the capturing mobile device 724 and user video storage 932. In an embodiment, site controller 712 can coordinate the transfer of information from mobile devices to NAS 750 (e.g., captured media) with activities taking place during the event. When interacting with mobile devices 724, some embodiments of site controller 712 can provide end user interfaces 926 to enable different types of interaction. For example, as a part of engagement activities, site controller may offer quizzes and other content to the devices. Additionally, with respect to location determinations discussed herein, site controller can supplement determined estimates with voluntarily provided information using end user interfaces 926, stored in a storage that is not shown.

In some embodiments, to guide the performance of different activities, site controller 712 and/or other components may use executable code 938 tangibly stored in code storage 939. In some embodiments, site information storage 937 can provide information about the site, e.g., events, seat maps, attendee information, geographic location of destinations (e.g., concessions, bathrooms, exits, etc.), as well as 3D models of site features and structure.

Figure 10:
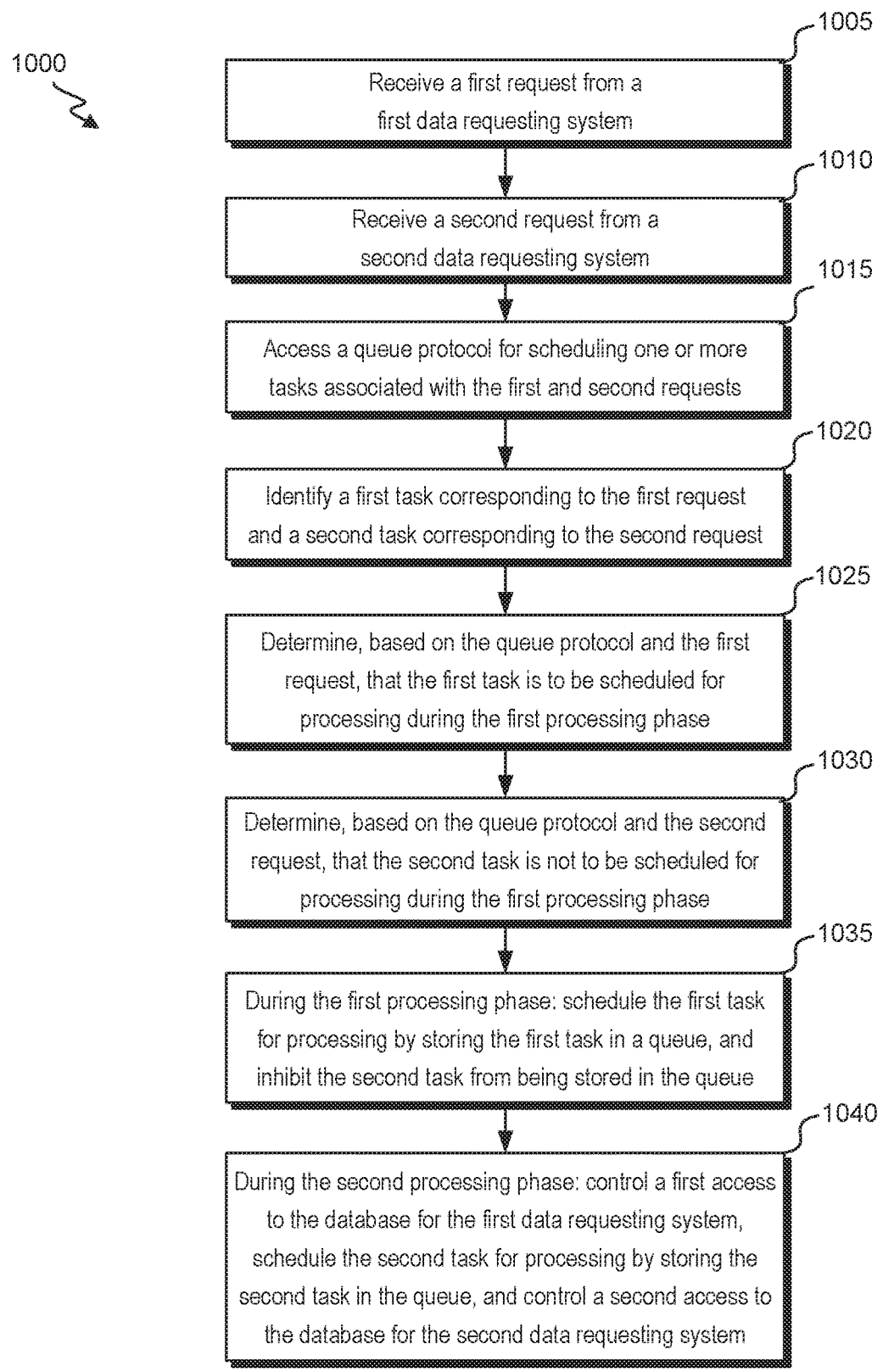
FIG. 10 is a flowchart illustrating a process for task scheduling of data access control according to an embodiment.

FIG. 10 is a flowchart illustrating process 1000 for scheduling task processing for data access control. Part or all of process 1000 may be performed, for example, at an access management system, data requesting systems, data accessing systems, various electronic devices (e.g., a user device), and/or one or more data stores (e.g., data stores associated with the access management system). It will be appreciated that performance of process 1000 may be distributed. For example, various servers (e.g., co-located servers or geographically dispersed servers) may perform different actions in process 1000.

Examples of one or more user devices may include, for example, a computer, a mobile device, a smart phone, a laptop, a thin client device, a tablet, an electronic kiosk, and other suitable electronic devices. A data requesting system may be a user device or a system including one or more servers and data stores. A data accessing system may be an electronic device (e.g., a user device) having access to data associated with a user. Further, the access management system can include one or more servers and/or one or more data stores. The one or more servers and the one or more data stores may or may not be geographically co-located.

At block 1005, the access management system may receive a first communication from a first data requesting system (e.g., a user device). For example, the first communication may include a first request to access one or more databases. In some examples, the first request may be associated with a request to retrieve certain data from a database. The request to retrieve data from the database may correspond to a request to retrieve access-right data from the database. The access-right data may represent one or more access rights indicative of access to a resource. In some examples, the first request may include a restriction parameter that can be used to query the database in order to retrieve the access-right data. For example, the restriction parameter included in the first request may be a parameter relating to an attribute of an access right stored in the database. When the database is queried (at a later block), the queried is based on the restriction parameter. Examples of restriction parameters may include an attribute of an access right, a type of access right, a range of an attribute associated with the access right, and other suitable parameters.

In some examples, the first request may originate from an application executed on the first data requesting system. For example, a content element may be displayed on a display of the first data requesting system as part of the application being executed on the first data requesting system. the content element, when selected by a user operating the first data requesting system, may initiate transmission of the first communication from the first data requesting system to the access management system.

At block 1010, the access management system may receive a second communication from a second data requesting system. For example, a second data requesting system may be a user device or a bot user operated at a server farm. The second communication may include a second request to access the database. In some examples, the second request may be associated with a request to retrieve certain data from a database. The request to retrieve data from the database may correspond to a request to retrieve access-right data from the database. The access-right data may represent one or more access rights indicative of access to a resource. In some examples, the second request may include a restriction parameter that can be used to query the database in order to retrieve the access-right data. For example, the restriction parameter included in the second request may be a parameter relating to an attribute of an access right stored in the database. When the database is queried (at a later block), the queried is based on the restriction parameter. Examples of restriction parameters may include an attribute of an access right, a type of access right, a range of an attribute associated with the access right, and other suitable parameters.

At block 1015, the access management system may access a queue protocol in response to receiving the first and second requests. The queue protocol may be for scheduling one or more tasks associated with the first and second requests. In some examples, the queue protocol may include data representing a first processing phase and a second processing phase. The first and second processing phases may be time periods for which tasks associated with the first and second requests can be processed. For example, the first processing phase may be a time period in which certain tasks are scheduled for processing and other tasks are not scheduled. Further, the second processing phase may be a time period after the first processing phase in which the schedule tasks are processed and the unscheduled tasks are scheduled. In some examples, a queue protocol can include data representing a workflow or decisions tree for processing tasks associated with the first and second requests. For example, a queue protocol may identify a task associated with the first request. The task may include a task for accessing and querying the database. The task may be schedule to be processed at a later time.

In some examples, the queue protocol may be accessed based on one or more factors, for example, based on the data included in the first and second requests. For example, a queue protocol may identify which tasks to select for processing related to the first and second requests. As another example, a queue protocol may identify the first and second processing phases.

At block 1020, the access management system may identify a first task associated with the first request and a second task associated with the second request. In some examples, the first and second tasks may be identified based on the queue protocol accessed at block 1015. For example, the queue protocol may determine that the first and second tasks may be tasks for scheduling queries of the database. The first task may enable the first data requesting system to access the database when the first task is processed. The second task may enable the second data requesting system to access the database when the second task is processed.

In some embodiments, the first task may correspond to a task for querying the database. For example, the first task may include querying the database based on the restriction parameters included in the first request. In this example, the first task may include querying the database to retrieve access rights correspond to the restriction parameters of the first request. The second task may similarly correspond to a task for querying the database based on the restriction parameters of the second request. It will be appreciated that tasks may include actions other than querying a database. For example, it will be appreciated that tasks may include associating a data requesting system with an access right.

At block 1025, the access management system may determine whether the first task is to be scheduled during a first processing phase. For example, the access management system may determine that the first task is to be scheduled during the first processing phase based at least in part on the queue protocol and/or the first request.

In some embodiments, the first request may include authentication information, which represents whether one or more authentication tests were executed on the first data requesting system. For example, the authentication information may identify a particular authentication test, whether the authentication test was executed on the first data requesting system, and whether the particular authentication test was successfully completed by an operator of the first data requesting system. An authentication test may be executed so as to identify whether an operator of the first data requesting system is authorized to access the database. Examples of authentication tests include digital representations of prompts displayed on the first data requesting systems, such that the prompts can receive inputs from the operator of the first data requesting system. The prompts may be used to determine whether the operator is authorized to access the database or not. For additional examples of authentication tests (e.g., verification steps), see U.S. Ser. No. 14/489,241, filed in the United States Patent & Trademark Office on Sep. 17, 2014, the disclosure of which is hereby incorporated by reference herein in its entirety for all purposes.

In some embodiments, the access management system may determine whether the first task associated with the first request is to be scheduled for processing during the first processing phase based at least in part on the queue protocol and/or the authentication information included in the first request. For example, the queue protocol may include information indicating that tasks are to be scheduled during the first processing phase when the authentication information identifies the operator of the first data requesting system as being an authorized user. As another example, the queue protocol may include information indicating that tasks are to be scheduled during the first processing phase when the authentication information identifies the first data requesting system as being an authorized device. For example, when the authentication information indicates that one or more authentication tests were executed on the first data requesting system and were successfully completed, the access management system may determine that the first data requesting system is an authorized device and may determine that the first task is to be scheduled during the first processing phase. As a further example, when the authentication information indicates that one or more authentications tests were not executed on the first data requesting system or that the one or more authentication tests were not successfully completed, the access management system may determine that the first task is not to be scheduled during the first processing phase. For example, see U.S. Ser. No. 14/489, 241, filed in the United States Patent & Trademark Office on Sep. 17, 2014, the disclosure of which is hereby incorporated by reference herein in its entirety for all purposes. It will be appreciated that the execution of a authentication test and the successful completion of the authentication test on the first data requesting system may render the first data requesting system an authorized device for accessing the database.

At block 1030, the access management system may determine whether the second task is to be scheduled during the first processing phase. The access management system may perform the steps described at block 1025 for determining whether the second task is to be scheduled during the first processing phase. For example, when the authentication information included in the second request indicates that the second data requesting system is not an authorized device, the access management system may determine that the second task is not to be scheduled during the first processing phase.

It will be appreciated that the access management system may determine a classification assignment for each of the first data requesting system and the second data requesting system. For example, a classification assignment may indicate whether the first data requesting system is an authorized device or whether the second data requesting system is an unauthorized device. The classification assignment may be determined based on the authentication information. For example, if the authentication information indicates that the first data requesting system corresponds to an authorized device, the access management system may determine that the classification assignment for the first data requesting system may be an authorized user. As another example, if the authentication information indicates that the second data requesting system corresponds to an unauthorized device, the access management system may determine that the classification assignment for the second data requesting system may be an unauthorized user. In some examples, whether the first task or second task are scheduled (e.g., stored in the queue) during the first processing phase may depend on the determined classification assignments.

At block 1035, the access management system may initiate (e.g., start or begin) the first processing phase. For example, the first processing phase may be a first period of time during which tasks are scheduled for processing but not processed yet. In an example where the first task has been determined to be scheduled during the first processing phase and the second task has been determined not to be scheduled during the first processing phase, when the first processing phase begins, the access management system may schedule the first task by storing the first task in a queue. Further, the access management system may inhibit the second task from being stored in the queue during the first processing phase. For example, the second task may be inhibited from being stored in the queue by being stored in a buffer or a storage device, such that the second task is stored, but not stored in the queue during the first processing system.

Tasks in the queue may be stored in a particular order (e.g., in a first-come-first-stored order) and the tasks may be processed in the order in which they are stored in the queue. The queue may be used for storing certain tasks early (e.g., during the first processing phase) and processing the tasks at a later time (e.g., during a second processing phase occurring after the first processing phase).

In some embodiments, when multiple tasks are determined to be scheduled during the first processing phase, the multiple tasks may be prioritized (e.g., placed in an order) and then stored in the queue in the prioritized order. For example, the multiple tasks may be prioritized based on a number of authentication tests executed on the data requesting devices, or a number of successfully completed authentication tests.

It will be appreciated that the first processing phase is for storing tasks associated with requests for data access (e.g., access to the database) received from authorized devices. An authorized device may be a data requesting system which has executed and successfully completed an authentication test. For example, see U.S. Ser. No. 14/489,241, filed in the United States Patent & Trademark Office on Sep. 17, 2014, the disclosure of which is hereby incorporated by reference herein in its entirety for all purposes.

It will also be appreciated that the access management system may execute one or more modification protocols when managing the second request and/or the second task. In some examples, when the access management system receives the second request and determines that the second request includes authentication information indicating that one or more authentication tests were not executed or successfully completed on the second data requesting system (e.g., thereby indicating that the second data requesting system is not an authorized device), the access management system may execute a modification protocol that serves to inhibit or reduce an efficiency of interactions between the access management system and the second data requesting system.

For example, a modification protocol, when executed, may modify an interface displayed at the second data requesting system. In some embodiments, modifying the interface may include slowing down a speed of communication between the access management system and the second data requesting system, such that a delay period is experienced at the second data requesting system. It will be appreciated that the delay period may occur at the second data requesting system at any of the blocks of process 1000. For example, as discussed herein, when the access management system identifies that the second data requesting system is an unauthorized device (e.g., because one or more authentication tests were not successfully completed), the access management system may execute a modification protocol that initiates a delay period at the interface displayed at the second data requesting system, such that a delay is experienced at the second data requesting system when the second task is ultimately processed (e.g., the delay period may be initiated when the second task is processed at block 1040). For example, see U.S. Ser. No. 14/214,323, filed on Mar. 14, 2014 in the United States Patent & Trademark Office, the disclosure of which is hereby incorporated by reference herein in its entirety for all purposes.

At block 1040, the access management system may identify that the first processing phase has completed and that the second processing phase has been initiated. For example, the second processing phase may be a period of time after the first processing phase has finished. Depending on embodiments, there may or may not be overlap between the first and second processing phases.

In an example where the first task has been determined to be scheduled during the first processing phase and the second task has been determined not to be scheduled during the first processing phase, when the second processing phase begins, the access management system may process the first task and subsequently schedule the second task by storing the second task in the queue. In some examples, processing the first task and storing the second task in the queue may occur sequentially, and in other examples, processing the first task and storing the second task may occur simultaneously. Further, the second task may be stored in the queue such that the first task is prioritized over the second task. For example, the second task may be stored in the queue such that the second task will be processed after the first task is processed. Accordingly, an advantage of storing the first task in the queue during the first processing phase may be that the first task is processed before the second task is scheduled and processed. Processing the first task before the second task corresponds to the first data requesting system accessing the database before the second data requesting system.

The tasks stored in the queue may be processed in a particular order. For example, tasks stored in the queue may be processed by queue position (e.g., the position in which a task is stored). In some embodiments, processing the first task may include the access management system controlling access between the first data requesting system and the database. Controlling access between the first data requesting system and the database may include enabling the first data requesting system to access the database. For example, controlling access may correspond to querying the database based on the restriction parameters included in the first request. In this example, processing the first task corresponds to querying the database based on the restriction parameters in the first request. The database may response to the query by identifying access-right data (stored in the database) that satisfies the restriction parameters. For example, the database may return one or more access rights satisfying the restriction parameters to the first data requesting system. The first data requesting system may initiate a process of being associated with the one or more access rights returned by the first data requesting system. Associating an access right with the first data requesting system may include the first data requesting system completing a process that associates the first data requesting system with the access right such that the access right is indicative of access to a resource for the first data requesting system. For example, see U.S. Ser. No. 14/489,241, filed in the United States Patent & Trademark Office on Sep. 17, 2014, the disclosure of which is hereby incorporated by reference herein in its entirety for all purposes.

In addition, the second task, which was determined not to be scheduled (e.g., stored in the queue) during the first processing phase, may be scheduled during the second processing phase. Scheduling the second task during the second processing phase may include storing the second task in the queue during the second processing phase. The second task may be processed at a time after the second task is stored in the queue. In some examples, the second task may be scheduled (e.g., stored in the queue) and processed during the second processing phase. In other examples, the second task may be scheduled during the second processing phase and processed at a later time. Further, in some examples, storing the second task may occur at the same time as processing the first task during the second processing phase. In these examples, processing the second task occurs after the first task has been processed. In other examples, the first task may be processed and the second task may be stored in the queue at a later time.

When the second task is ultimately processed, the second task is processed in a similar manner to the first task. For example, the access management system enables the second data requesting system to access the database. In this example, the access management system enables querying of the database by the second data requesting system, such that the database is queried based on restriction parameters included in the second request. The database may return one or more access rights that satisfy the restriction parameters included in the second request. The second data requesting system may initiate a process for associating with an access right of the one or more returned access right, if any are available. The second data requesting system is inhibited from early access to the database (e.g., inhibited from having the second task stored in the queue during the first processing phase) because one or more authentication tests were not executed or successfully completed on the second data requesting system. The second data requesting system's access to the database occurs after the first data requesting system's access to the database because, as in the examples above, the first data requesting system executed and successfully completed one or more authentication tests on the first data requesting system and the second data requesting system did not execute or successfully complete one or more authentication tests on the second data requesting system.

Accordingly, processing resources (e.g., CPUs that process requests to access a database) may be improved and efficiently managed using task scheduling techniques. The overall processing demand (e.g., system load) experienced at a processor that manages data access may be reduced due to the task scheduling of data access control, thereby improving the performance and functionality of the processor.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method for scheduling tasks using queue protocols to control data access, the method comprising:

receiving one or more first communications from a first user device, the one or more first communications corresponding to a first request for retrieving ticket data from a database, and the ticket data corresponding to an event;

receiving one or more second communications from a second user device, the one or more second communications corresponding to a second request to access ticket data from the database;

accessing a queue protocol that identifies a first processing phase and a second processing phase, the first processing phase occurring prior to the second processing phase, and the queue protocol enabling electronic tickets corresponding to the ticket data to be assigned responsive to requests during the second processing phase, but not the first processing phase;

determining that each of the one or more first communications and the one or more second communications are received during the first processing phase;

determining, based at least in part on the queue protocol, that the one or more first communications correspond to authentication data associated with completion of an authentication process;

determining, based at least in part on the queue protocol, that the one or more second communications do not correspond to the authentication data;

during the first processing phase:
 transmitting interface data to the first user device based on the determination that the one or more first communications correspond to the authentication data, the interface data causing an interface to be displayed at the first user device, the interface enabling the first user device to register for the event, registering for the event enabling the first user device to transmit a third request for one or more electronic tickets to the event during the first processing phase,
 receiving an indication that the first user device has registered for the event using the interface,
 receiving the third request from the first user device during the first processing phase, the third request including a first constraint for querying the database, and the first constraint being stored in association with the first user device during the first processing phase, and
 inhibiting the interface data from being transmitted to the second user device based on the determination that the one or more second communications do not correspond the authentication data, and inhibiting the interface data from being transmitted to the second user device preventing the second user device from being registered for the event during the first processing phase; and during the second processing phase:
 performing a first query of the database based on the first constraint, the first query being responsive to the third request, and the first query resulting in identification of at least one first electronic ticket that satisfies the first constraint,
 transmitting a third communication to the first user device, the third communication corresponding to a first identifier of the at least one first electronic ticket,
 transmitting the interface data to the second user device, the interface data causing the interface to be displayed at the second user device, and the interface enabling the second user device to transmit a fourth request for the one or more electronic tickets to the event,
 receiving the fourth request from the second user device, the fourth request corresponding to a second constraint for querying the database,
 performing a second query of the database based on the second constraint, the second query being responsive to the fourth request and being performed after the first query, and the second query resulting in identification of at least one second electronic ticket to the event, and
 transmitting a fourth communication to the second user device, the fourth communication corresponding to a second identifier of the at least one second electronic ticket.

2. The computer-implemented method for scheduling tasks using queue protocols to control data access as recited in claim 1, wherein determining that the one or more first communications correspond to the authentication data associated with completion of the authentication process comprises:

identifying the authentication data included in the one or more first communications, the authentication data representing whether one or more authentication tests were executed using the first user device;

determining whether the first user device corresponds to a bot user, the determination of whether the first user device corresponds to a bot user being based on the authentication data; and transmitting the interface data to the first user device during the first processing phase based on the determination that the first user device does not correspond to a bot user.

3. The computer-implemented method for scheduling tasks using queue protocols to control data access as recited in claim 2, wherein the determination that the first user device does not correspond to a bot user indicates that the first user device corresponds to an authorized device.

4. The computer-implemented method for scheduling tasks using queue protocols to control data access as recited in claim 1, wherein determining that the one or more second communications do not correspond to the authentication data comprises:

determining that the authentication data is not included in the one or more second communications, the authentication data representing whether one or more authentication tests were executed using the second user device;

determining whether the second user device corresponds to a bot user, the determination of whether the second user device corresponds to a bot user being based on the authentication data; and determining that the interface data is not to be transmitted to the second user device during the first processing phase based on the determination that the second user device corresponds to a bot user.

5. The computer-implemented method for scheduling tasks using queue protocols to control data access as recited in claim 4, wherein the determining that the second user device corresponds to a bot user indicates that the second user device corresponds to an unauthorized device, and wherein a modification protocol for modifying an interface displayed at the second user device is accessed based on the determination that the second user device corresponds to a bot user.

6. The computer-implemented method for scheduling tasks using queue protocols to control data access as recited in claim 1, wherein performing the first query of the database based on the first constraint comprises:
establishing a communication link between the first user device and the database; and
performing a query of access-right data stored in the database, the access-right data representing a set of electronic tickets to the event, and the query being performed based on the first constraint included in the third request.

7. The computer-implemented method for scheduling tasks using queue protocols to control data access as recited in claim 5, wherein performing the second query of the database based on the second constraint comprises:
establishing a communication link between the second user device and the database;
executing the modification protocol by initiating a delay period during the querying of the database; and
performing a query of access-right data stored in the database, the access-right data representing a set of electronic tickets to the event, and the query being performed based on the second constraint included in the fourth request.

8. A system, comprising:
one or more data processors; and
a non-transitory computer-readable storage medium containing instructions which, when executed on the one or more data processors, cause the one or more data processors to perform operations including:
receiving one or more first communications from a first user device, the one or more first communications corresponding to a first request for retrieving ticket data from a database, and the ticket data corresponding to an event;
receiving one or more second communications from a second user device, the one or more second communications corresponding to a second request to access ticket data from the database;
accessing a queue protocol that identifies a first processing phase and a second processing phase, the first processing phase occurring prior to the second processing phase, and the queue protocol enabling electronic tickets corresponding to the ticket data to be assigned responsive to requests during the second processing phase, but not the first processing phase;
determining that each of the one or more first communications and the one or more second communications are received during the first processing phase;
determining, based at least in part on the queue protocol, that the one or more first communications correspond to authentication data associated with completion of an authentication process;
determining, based at least in part on the queue protocol, that the one or more second communications do not correspond to the authentication data;
during the first processing phase:
transmitting interface data to the first user device based on the determination that the one or more first communications correspond to the authentication data, the interface data causing an interface to be displayed at the first user device, the interface enabling the first user device to register for the event, registering for the event enabling the first user device to transmit a third request for one or more electronic tickets to the event during the first processing phase,
receiving an indication that the first user device has registered for the event using the interface,
receiving the third request from the first user device during the first processing phase, the third request including a first constraint for querying the database, and the first constraint being stored in association with the first user device during the first processing phase, and
inhibiting the interface data from being transmitted to the second user device based on the determination that the one or more second communications do not correspond the authentication data, and inhibiting the interface data from being transmitted to the second user device preventing the second user device from being registered for the event during the first processing phase; and
during the second processing phase:
performing a first query of the database based on the first constraint, the first query being responsive to the third request, and the first query resulting in identification of at least one first electronic ticket that satisfies the first constraint,
transmitting a third communication to the first user device, the third communication corresponding to a first identifier of the at least one first electronic ticket,
transmitting the interface data to the second user device, the interface data causing the interface to be displayed at the second user device, and the interface enabling the second user device to transmit a fourth request for the one or more electronic tickets to the event,
receiving the fourth request from the second user device, the fourth request corresponding to a second constraint for querying the database,
performing a second query of the database based on the second constraint, the second query being responsive to the fourth request and being performed after the first query, and the second query resulting in identification of at least one second electronic ticket to the event, and
transmitting a fourth communication to the second user device, the fourth communication corresponding to a second identifier of the at least one second electronic ticket.

9. The system as recited in claim 8, wherein determining that the one or more first communications correspond to the authentication data associated with completion of the authentication process comprises:
identifying the authentication data included in the one or more first communications, the authentication data representing whether one or more authentication tests were executed using the first user device;
determining whether the first user device corresponds to a bot user, the determination of whether the first user device corresponds to a bot user being based on the authentication data; and
transmitting the interface data to the first user device during the first processing phase based on the determination that the first user device does not correspond to a bot user.

10. The system as recited in claim 9, wherein the determination that the first user device does not correspond to a bot user indicates that the first user device corresponds to an authorized device.

11. The system as recited in claim 8, wherein determining that the one or more second communications do not correspond to the authentication data comprises:
  determining that the authentication data is not included in the one or more second communications, the authentication data representing whether one or more authentication tests were executed using the second user device;
  determining whether the second user device corresponds to a bot user, the determination of whether the second user device corresponds to a bot user being based on the authentication data; and
  determining that the interface data is not to be transmitted to the second user device during the first processing phase based on the determination that the second user device corresponds to a bot user.

12. The system as recited in claim 11, wherein the determining that the second user device corresponds to a bot user indicates that the second user device corresponds to an unauthorized device, and wherein a modification protocol for modifying an interface displayed at the second user device is accessed based on the determination that the second user device corresponds to a bot user.

13. The system as recited in claim 8, wherein performing the first query of the database based on the first constraint comprises:
  establishing a communication link between the first user device and the database; and
  performing a query of access-right data stored in the database, the access-right data representing a set of electronic tickets to the event, and the query being performed based on the first constraint included in the third request.

14. The system as recited in claim 12, wherein performing the second query of the database based on the second constraint comprises:
  establishing a communication link between the second user device and the database;
  executing the modification protocol by initiating a delay period during the querying of the database; and
  performing a query of access-right data stored in the database, the access-right data representing a set of electronic tickets to the event, and the query being performed based on the second constraint included in the fourth request.

15. A computer-program product tangibly embodied in a non-transitory machine-readable storage medium, including instructions configured to cause a data processing apparatus to perform operations including:
  receiving one or more first communications from a first user device, the one or more first communications corresponding to a first request for retrieving ticket data from a database, and the ticket data corresponding to an event;
  receiving one or more second communications from a second user device, the one or more second communications corresponding to a second request to access ticket data from the database;
  accessing a queue protocol that identifies a first processing phase and a second processing phase, the first processing phase occurring prior to the second processing phase, and the queue protocol enabling electronic tickets corresponding to the ticket data to be assigned responsive to requests during the second processing phase, but not the first processing phase;
  determining that each of the one or more first communications and the one or more second communications are received during the first processing phase;
  determining, based at least in part on the queue protocol, that the one or more first communications correspond to authentication data associated with completion of an authentication process;
  determining, based at least in part on the queue protocol, that the one or more second communications do not correspond to the authentication data;
  during the first processing phase:
    transmitting interface data to the first user device based on the determination that the one or more first communications correspond to the authentication data, the interface data causing an interface to be displayed at the first user device, the interface enabling the first user device to register for the event, registering for the event enabling the first user device to transmit a third request for one or more electronic tickets to the event during the first processing phase,
    receiving an indication that the first user device has registered for the event using the interface,
    receiving the third request from the first user device during the first processing phase, the third request including a first constraint for querying the database, and the first constraint being stored in association with the first user device during the first processing phase, and
    inhibiting the interface data from being transmitted to the second user device based on the determination that the one or more second communications do not correspond the authentication data, and inhibiting the interface data from being transmitted to the second user device preventing the second user device from being registered for the event during the first processing phase; and
  during the second processing phase:
    performing a first query of the database based on the first constraint, the first query being responsive to the third request, and the first query resulting in identification of at least one first electronic ticket that satisfies the first constraint,
    transmitting a third communication to the first user device, the third communication corresponding to a first identifier of the at least one first electronic ticket,
    transmitting the interface data to the second user device, the interface data causing the interface to be displayed at the second user device, and the interface enabling the second user device to transmit a fourth request for the one or more electronic tickets to the event,
    receiving the fourth request from the second user device, the fourth request corresponding to a second constraint for querying the database,
    performing a second query of the database based on the second constraint, the second query being responsive to the fourth request and being performed after the first query, and the second query resulting in identification of at least one second electronic ticket to the event, and
    transmitting a fourth communication to the second user device, the fourth communication corresponding to a second identifier of the at least one second electronic ticket.

16. The computer-program product as recited in claim 15, wherein determining that the one or more first communications correspond to the authentication data associated with completion of the authentication process comprises:
- identifying the authentication data included in the one or more first communications, the authentication data representing whether one or more authentication tests were executed using the first user device;
- determining whether the first user device corresponds to a bot user, the determination of whether the first user device corresponds to a bot user being based on the authentication data; and
- transmitting the interface data to the first user device during the first processing phase based on the determination that the first user device does not correspond to a bot user.

17. The computer-program product as recited in claim 15, wherein determining that the one or more second communications do not correspond to the authentication data comprises:
- determining that the authentication data is not included in the one or more second communications, the authentication data representing whether one or more authentication tests were executed using the second user device;
- determining whether the second user device corresponds to a bot user the determination of whether the second user device corresponds to a bot user being based on the authentication data; and
- determining that the interface data is not to be transmitted to the second user device during the first processing phase based on the determination that the second user device corresponds to a bot user.

18. The computer-program product as recited in claim 17, wherein the determining that the second user device corresponds to a bot user indicates that the second user device corresponds to an unauthorized device, and wherein a modification protocol for modifying an interface displayed at the second user device is accessed based on the determination that the second user device corresponds to a bot user.

19. The computer-program product as recited in claim 15, wherein performing the first query of the database based on the first constraint comprises:
- establishing a communication link between the first user device and the database; and
- performing a query of access-right data stored in the database, the access-right data representing a set of electronic tickets to the event, and the query being performed based on the first constraint included in the third request.

20. The computer-program product as recited in claim 18, wherein performing the second query of the database based on the second constraint comprises:
- establishing a communication link between the second user device and the database;
- executing the modification protocol by initiating a delay period during the querying of the database; and
- performing a query of access-right data stored in the database, the access-right data representing a set of electronic tickets to the event, and the query being performed based on the second constraint included in the fourth request.

* * * * *

UNITED STATES PATENT AND TRADEMARK OFFICE
CERTIFICATE OF CORRECTION

PATENT NO. : 9,762,390 B2  
APPLICATION NO. : 15/050090  
DATED : September 12, 2017  
INVENTOR(S) : Robert McEwen et al.

Page 1 of 1

It is certified that error appears in the above-identified patent and that said Letters Patent is hereby corrected as shown below:

On the Title Page

In the Inventors after Hsu; Debbie
Item (72) Please remove "(Los Ageles, CA)" and insert --(Los Angeles, CA)--

Signed and Sealed this
Twenty-fourth Day of April, 2018

Andrei Iancu
*Director of the United States Patent and Trademark Office*